2,734,646

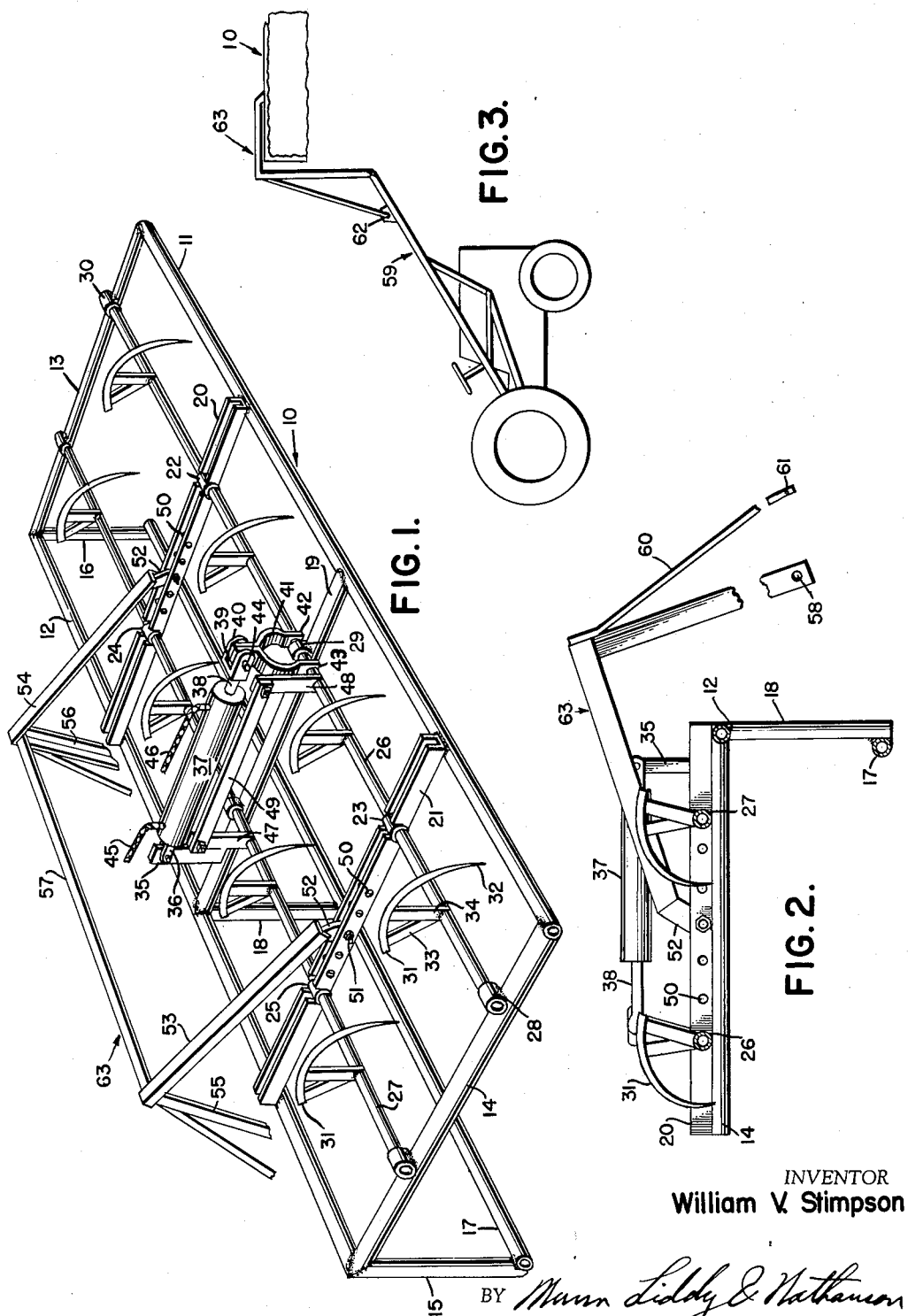
Feb. 14, 1956 — W. V. STIMPSON — 2,734,646
HAY LOADER
Filed Feb. 13, 1953
INVENTOR
William V. Stimpson
BY
ATTORNEY

United States Patent Office 2,734,646
Patented Feb. 14, 1956

HAY LOADER

William Veral Stimpson, Dietrich, Idaho

Application February 13, 1953, Serial No. 336,818

2 Claims. (Cl. 214—147)

This invention relates to tractor mounted loader devices and in particular to a hay loader.

The difficulty of obtaining farm labor and the high cost thereof is today felt even on the smallest farms. For these and other reasons successful farming today depends upon the development and use of special tools and implements to handle the chores that were formely undertaken by manual labor. Such equipment, to be satisfactory, must be able to perform the intended task with efficiency and speed. Accordingly it is an object of this invention to provide a hay loader that efficiently loads baled hay and which reduces the amount of time necessary to load a given quantity thereof.

Also of importance in farm machinery is the need to keep the cost of the equipment as low as possible. Extremely high initial costs often prevent the average farmer from acquiring a desirable piece of equipment. Furthermore, large initial costs require a considerable use of the machine in order to amortize the initial outlay. It is accordingly a further object of this invention to provide a low cost hay loader.

A further consideration, analogous to that of cost, is common to all machinery, namely, the desirability of having a machine as simple in construction and operation as is possible. This not only results in low initial cost, but also contributes to ease of operation and control, low maintenance costs and portability. It is, therefore, another object of this invention to provide a hay bale loader of simplicity in construction and operation, yet which is entirely adequate for efficiently performing its intended task.

Equipment which can be interchangeably mounted on a number of various prime mover units presently used is most attractive to the average farmer. Such type of equipment is more suitable for the average farmer considering all factors such as cost, upkeep, storage, etc. than equipment which is accompanied by its individual power drive and vehicle means. It is accordingly a still further object of this invention to provide a hay loading mechanism which can be readily attached to tractor mounted loader frames or loader devices which are commonly used today.

These and other objects and advantages will become apparent from the following description of the present invention illustrated in the accompanying drawing, in which:

Figure 1 is a perspective view of a loader constructed in accordance with the invention.

Figure 2 is a side elevational view of the device as shown in Fig. 1.

Figure 3 is a sketch illustrating the manner in which the baler is used.

Similar reference characters represent similar parts in the several figures. Reference character 10 indicates the frame composed of front and rear members 11, 12, side members 13, 14 and dependent rear legs 15 and 16. The rear legs are interconnected by a lower rear member 17. Additional depending rear elements such as 18 are also provided. While one member 18 is shown in the drawing, it is obvious that other members may be used. A central frame element 19 extends parallel to side members 13 and 14 and interconnects front and rear members or elements 11 and 12 at approximately the middle of the loader. Additional stiffening and interconnecting elements 20 and 21 overlie and are connected to frame 10. The latter elements form an integral part of the frame. The frame elements so far described may, as shown, be formed and cut from pipe, angle iron or other suitable shapes of metal and interconnected by welding. The elements 20 and 21, for example, may be formed of pieces of angle iron having one leg of each welded to the other.

Frame elements 20 and 21 have aligned apertures 22, 23 and 24, 25 cut therein. The aligned apertures receive operating shafts 26 and 27 respectively. Tubular frame elements 13, 14 and 19 have pillow blocks or bearing elements, such as 28, 29, 30 mounted thereon. Similar bearings are mounted in apertures 22, 23, 24 and 25. The bearing elements are secured to the frame in any convenient manner and may be of the split type to facilitate assembly. Shafts 26 and 27 are rotatably supported in the bearing elements. The shafts 26 and 27 may each be formed of round stock. Obviously any suitable bearings may be employed. Bale engaging needles or hooks 31 are mounted at equally spaced distances from each other along each one of the shafts 26 and 27. The bale engaging hooks on the front and rear shafts are in alignment and each is positioned approximately at the middle of the distance between the adjacent frame members running laterally of the front and rear members 11 and 12. Each needle comprises a curved member having a pointed end 32. The needles shown are supported on the shafts by means of two braces or spokes 33 and 34 which are secured to the shafts and needles by welding or other suitable means. The needles are curved approximately on a radius of 6 inches from the center of the shafts. It is understood, of course, that any suitable radius or curvature may be employed.

An upstanding support leg 35 is mounted adjacent the rear of the central frame member 19. Fork like brackets 36 and the hydraulic cylinder 37 are pivotally connected to the support leg 35. Piston rod 38 projects forwardly of the cylinder. At its forward end the piston rod is provided with a connecting bracket 39 comprising fork like elements 40. A depending connecting link 41 comprising curved fork elements 42 and 43 is pivotally connected to the element 40 by a pin 44. Each leg 42 and 43 is fixedly secured to shaft 26. The hydraulic cylinder is preferably of the double acting type of construction. Any cylinder which is not too large or heavy may be used. The usual hydraulic lines 45 and 46 are provided and attached to a suitable control mechanism and pump, not shown, but ordinarily provided on a tractor or other farm implement with which the hay loader is to be used. The front and rear shafts 26 and 27 are interconnected by means of radially extending arms 47 and 48 and connecting link 49. The connecting link is pivotally connected to elements 47 and 48. It is seen that by actuating the cylinder and piston in one direction the bale hooks rotate downwardly into a bale engaging position from the position shown in Figs. 1 and 2 of the drawing.

Lateral supporting members 20 and 21 both have aligned apertures 50 extending therethrough. The apertures on lateral member 21 are in alignment with the corresponding apertures on members 20 and 21. The apertures are adapted to receive bolts or shafts or other suitable devices 51 which pivotally receive plates 52 of boom or support frame 63. The plates 52 are each connected to angle elements 53, 54. The latter angle elements are in turn connected to depending members 55 and 56 respectively. A cross connecting angle brace 57 provides rigidity. Members 55 and 56 are each pierced at their lower end as shown at 58 so as to be connected to a loader frame such as 59 shown in Fig. 3. A strap 60 is secured to each of the legs 55, 56 and is also pierced at its lower end as at 61 so as to be connected to an upstanding flange 62 provided on the loader frame 59. The frame 10 can freely pivot on the support frame which is labeled 63 for convenience. The connections between the support frame 63 and the loader frame may be modified as needed.

When hay is baled it has customarily laid in the field in piles, often of eight bales side by side and three high. A wagon or truck is driven along one side of the pile. A tractor such as illustrated in Fig. 3 can then be driven on the opposite side of the bales and facing them. The hay loader and loader frame 59 can be then operated to pick up the bales and deposit them on the truck or wagon. In operation the hay loader is dropped onto the bales. The hydraulic cylinder is next operated to force the needles down into the bales. Then the loader frame is lifted and the tractor moved forward to place the bales over the truck. The needles force the bales backwardly against the rear elements 17, 18, etc. when the bales are lifted. Next the frame is lowered and the needles retracted. In the form of hay loader shown in Fig. 1 two needles are provided for engagement with each bale of hay and four bales can be lifted at one time. A single needle may be used for each bale, although the use of two needles is preferred. Also a loader for lifting a greater or lesser number of bales is obviously taught by my invention. The bales tend to remain in a horizontal position similar to the position in which they are customarily stacked due to the pivotal connection between the frame 10 and the boom 63. The point of connection between the boom 63 and the frame 10 can be adjusted by moving bolts 51.

The bale loader frame constructed in accordance with my invention is light and inexpensive. It can be easily maintained, stored, moved and attached to suitable tractor mounted loader frames. Furthermore, the hay loader is easy to operate and efficiently and swiftly accomplishes the loading of hay. With a loader constructed in accordance with the one herein disclosed an operator has loaded 145 bales on a wagon in less than 20 minutes.

While I have shown and described a preferred form of my invention, it will be understood that variations in details of form may be made without departure from the invention as defined in the appended claims.

I claim:

1. A hay loader comprising a boom, a frame adjustably and freely pivotally connected to said boom, said frame having a longitudinally arranged portion and a rear portion depending therefrom, forks pivotally mounted on said frame, said forks being pivoted for movement downwardly and rearwardly of said frame toward said rear portion, said frame normally freely pivoting to a position in which said longitudinally arranged portion is substantially parallel to the ground.

2. A hay loader comprising a boom having means for connection to a lifting device, a hay frame pivotally connected to said boom, said frame comprising horizontally and vertically extending portions, means for interconnecting said horizontal and vertical portions, said vertical portion depending from said horizontal portion, shafts extending parallel to said horizontal portion and being pivotally mounted thereon, hay engaging needles connected to said shafts and having pointed ends adapted to be thrust into hay, each of said shafts extending parallel to the other of said shafts, and the needles on each of said shafts being aligned laterally of the shafts with the needles on the other of said shafts, a longitudinal cylinder pivotally connected to said shafts and operable to cause rotation thereof, said shafts being movable by operation of said hydraulic means to move said hay engaging points of said needles downwardly and toward said vertically extending portion.

References Cited in the file of this patent

UNITED STATES PATENTS

| | | |
|---|---|---|
| 2,005,555 | Morkovski | June 18, 1935 |
| 2,587,769 | Rowe | Mar. 4, 1952 |
| 2,605,919 | Shattuck | Aug. 5, 1952 |
| 2,620,935 | Christiansen | Dec. 9, 1952 |